US012228906B2

(12) United States Patent
Wu et al.

(10) Patent No.: US 12,228,906 B2
(45) Date of Patent: Feb. 18, 2025

(54) CALIBRATION METHOD AND CALIBRATION SYSTEM FOR MACHINE TOOLS

(71) Applicant: INDUSTRIAL TECHNOLOGY RESEARCH INSTITUTE, Hsinchu (TW)

(72) Inventors: Chung-Kai Wu, Taipei (TW); Chin-Ming Chen, Taichung (TW); Chun-Yu Tsai, New Taipei (TW); Chi-Chen Lin, Taichung (TW); Chia-Chin Chuang, Kaohsiung (TW); Ta-Jen Peng, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 374 days.

(21) Appl. No.: 17/719,133

(22) Filed: Apr. 12, 2022

(65) Prior Publication Data
US 2023/0205164 A1 Jun. 29, 2023

(30) Foreign Application Priority Data
Dec. 24, 2021 (TW) .................................. 110148670

(51) Int. Cl.
*G05B 19/401* (2006.01)
*B23Q 17/22* (2006.01)
*G05B 19/408* (2006.01)

(52) U.S. Cl.
CPC ........... *G05B 19/401* (2013.01); *B23Q 17/22* (2013.01); *G05B 19/4086* (2013.01); *G05B 2219/37069* (2013.01); *G05B 2219/37355* (2013.01)

(58) Field of Classification Search
CPC .............. G05B 19/401; G05B 19/4086; G05B 2219/37069; G05B 2219/37355;
(Continued)

(56) References Cited

U.S. PATENT DOCUMENTS

| 7,278,222 B2 | 10/2007 | Maier et al. |
| 9,063,536 B2 | 6/2015 | Otsuki et al. |

(Continued)

FOREIGN PATENT DOCUMENTS

| CN | 105269404 A | 1/2016 |
| CN | 105729243 A | 7/2016 |

(Continued)

OTHER PUBLICATIONS

Blaser et al., "Adaptive learning control for thermal error compensation of 5-axis machine tools", Journal of Manufacturing Systems, 44, (2017), pp. 302-309.

(Continued)

*Primary Examiner* — Thomas C Lee
*Assistant Examiner* — Tyler Dean Hedrick
(74) *Attorney, Agent, or Firm* — Birch, Stewart, Kolasch & Birch, LLP (57) ABSTRACT

A calibration method for machine tools comprises: providing a workpiece on a machine tool; rotating the workpiece around a first rotation axis parallel to a main shaft of the machine tool and processing the workpiece by a first machining mode; measuring a first dimensional error of a shape of the workpiece along directions of first and second linear axes perpendicular to the first rotation axis; calculating a positional error of the first rotation axis according to the first dimensional error; rotating the workpiece around a second rotation axis perpendicular to the main shaft and processing the workpiece by a different second machining mode; measuring a second dimensional error of the shape of (Continued)

the workpiece along a direction of a third linear axis perpendicular to the second rotation axis; calculating a positional error of the second rotation axis according to the second dimensional error.

17 Claims, 8 Drawing Sheets

(58) Field of Classification Search
CPC .......... G05B 2219/50062; B23Q 17/22; B23Q 17/20; Y02P 90/02; B23C 9/00
See application file for complete search history.

(56) References Cited

U.S. PATENT DOCUMENTS

| | | | | |
|---|---|---|---|---|
| 2008/0114485 | A1* | 5/2008 | Katoh | G05B 19/404 700/193 |
| 2017/0232575 | A1 | 8/2017 | Bultez et al. | |
| 2020/0003544 | A1* | 1/2020 | Nahum | G01B 5/0004 |
| 2022/0184765 | A1* | 6/2022 | Maxted | G01B 5/28 |
| 2023/0003510 | A1* | 1/2023 | Morii | G01B 21/042 |

FOREIGN PATENT DOCUMENTS

| | | |
|---|---|---|
| CN | 105043190 B | 5/2017 |
| CN | 107450473 A | 12/2017 |
| CN | 108817488 A | 11/2018 |
| CN | 105723182 B | 3/2019 |
| CN | 110209123 A | 9/2019 |
| CN | 110280789 A | 9/2019 |
| CN | 110449988 A | 11/2019 |
| CN | 111273610 A | 6/2020 |
| CN | 111745462 A | 10/2020 |
| CN | 112222947 A | 1/2021 |
| CN | 111487923 B | 3/2021 |
| CN | 113110293 A | 7/2021 |
| CN | 113732818 A | 12/2021 |
| TW | M516714 U | 2/2016 |
| TW | 201839353 A | 11/2018 |
| TW | 202026589 A | 7/2020 |

OTHER PUBLICATIONS

Gebhardt et al., "Phenomenological compensation of thermally caused position and orientation errors of rotary axes", Journal of Manufacturing Processes, 15, (2013), pp. 452-459.
Ibaraki et al., "A machining test to identify rotary axis geometric errors on a five-axis machine tool with a swiveling rotary table for turning operations", Precision Engineering, 55, (2019), pp. 22-32.
Ibaraki et al., "Machining tests to identify kinematic errors on five-axis machine tools", Precision Engineering, 34, (2010), pp. 387-398.
Morimoto et al., "Accuracy Evaluation of 5-Axis Machining Center Based on Measurements of Machined Workpiece—Evaluation of Accuracy of 5-Axis Controlled Machining Center—", Int. J. of Automation Technology, vol. 6, No. 5, 2012, pp. 675-681.
Morimoto et al., "Study on Accuracy Compensation of Machining Center Based on Measurement Results of Machined Workpiece—Evaluation of Accuracy of 5-axis Controlled Machining Center—", [B1], The Japan Society of Mechanical Engineers, 2009, pp. 55-60.
Takeshima et al., "Finished Test Piece Example for Five-axis Machining Centers", The Japan Society of Mechanical Engineers, [C4], 2009, pp. 123-126.
Taiwanese Office Action and Search Report for Taiwanese Application No. 110148670, dated Jul. 22, 2022.

\* cited by examiner

CALIBRATION METHOD AND CALIBRATION SYSTEM FOR MACHINE TOOLS

This application claims the benefit of Taiwan application Serial No. 110148670, filed on Dec. 24, 2021, the subject matter of which is incorporated herein by reference.

BACKGROUND OF THE INVENTION

Field of the Invention

The invention relates in general to a calibration method and a calibration system for machine tools.

Description of the Related Art

In recent years, more and more machine tools have been developed towards multi-dimensional processing machines, so that the machine tools can process more complex products. In addition to the general three linear axes, the multi-axis machine tools also have several more rotation axes so that more machining errors are happened. The accuracy error of machine tools can be divided into the static accuracy error and the dynamic accuracy error. The static accuracy error can be easily measured by simple measuring tools, such as straight gages or dial indicators, etc., while the dynamic accuracy error often requires the purchase of expensive measuring instruments. To perform measurement and calibration, this is undoubtedly a great burden for cost.

However, the dynamic accuracy error is often a very direct factor affecting the processing yield. Therefore, how to realize the measurement of the dynamic accuracy error while overcoming the cost problem is a goal that the skilled in the art strives to achieve.

SUMMARY OF THE INVENTION

In view of the problem in the prior art, the present invention provides a compensation and calibration technique for the rotation center of the machine tool, which mainly processes the workpiece along the rotation axis with the linear axis, and the offset error of the rotation center can be known by measuring the processed workpiece, and then the offset error can be compensated inversely to calibrate the rotation center of the machine tool without using the expensive measuring instruments.

According to an aspect of the present invention, a calibration method for machine tools is provided and comprises the following steps: providing a workpiece on a machine tool; rotating the workpiece around a first rotation axis of the machine tool and processing the workpiece by a first machining mode, wherein the first rotation axis is parallel to a main shaft of the machine tool; measuring a first dimensional error of a shape of the workpiece along directions of a first linear axis and a second linear axis of the machine tool, wherein the first linear axis and second linear axis are perpendicular to the first rotation axis; calculating a positional error of the first rotation axis according to the first dimensional error of a shape of the workpiece to calibrate a rotation center of the machine tool; rotating the workpiece around a second rotation axis of the machine tool and processing the workpiece by a second machining mode different from the first machining mode, wherein the second rotation axis is perpendicular to the main shaft of the machine tool; measuring a second dimensional error of a shape of the workpiece along a direction of a third linear axis of the machine tool, wherein the third linear axis is perpendicular to the second rotation axis; and calculating a positional error of the second rotation axis according to the second dimensional error of the shape of the workpiece to calibrate another rotation center of the machine tool.

According to another aspect of the present invention, a calibration system for calibrating a machine tool is provided. The calibration system comprises a workpiece, a measuring element and a processing control element. The workpiece provided on the machine tool. After the workpiece is rotated around a first rotation axis of the machine tool and processed by a first machining mode, the measuring element is configured to measure a first dimensional error of a shape of the workpiece along directions of a first linear axis and a second linear axis of the machine tool, wherein the first rotation axis is parallel to a main shaft of the machine tool and the first linear axis and second linear axis are perpendicular to the first rotation axis. Also, after the workpiece is rotated around a second rotation axis of the machine tool and processed by a second machining mode different from the first machining mode, the measuring element is configured to measure a second dimensional error of a shape of the workpiece along a direction of a third linear axis of the machine tool, wherein the second rotation axis is perpendicular to the main shaft of the machine tool and the third linear axis is perpendicular to the second rotation axis. The processing control element is configured to calculate a positional error of the first rotation axis according to the first dimensional error of the shape of the workpiece to calibrate a rotation center of the machine tool and configured to calculate a positional error of the second rotation axis according to the second dimensional error of the shape of the workpiece to calibrate another rotation center of the machine tool.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
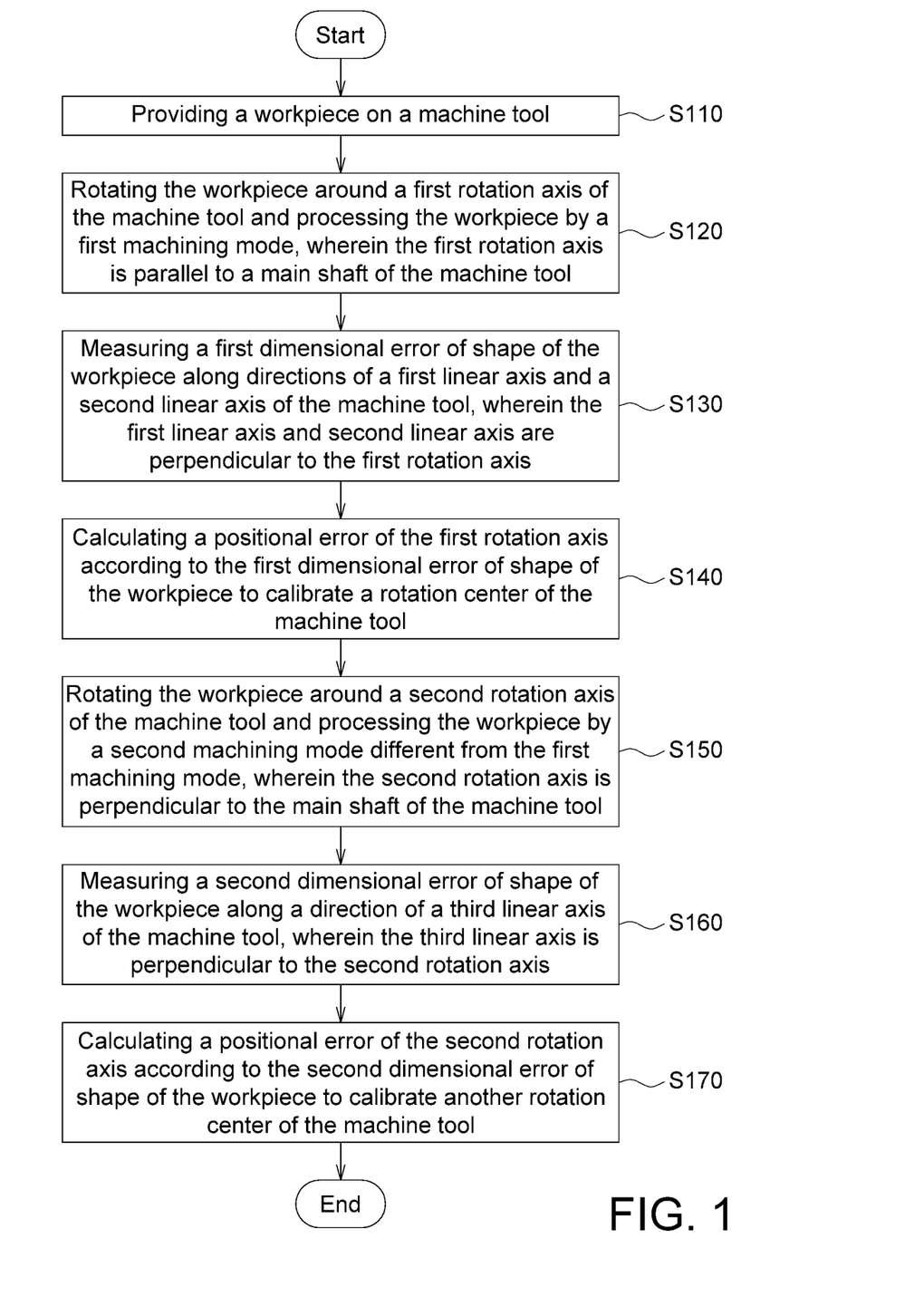
FIG. 1 is a flow chart of a calibration method for machine tools according to an embodiment of the present invention.
Figure 2:
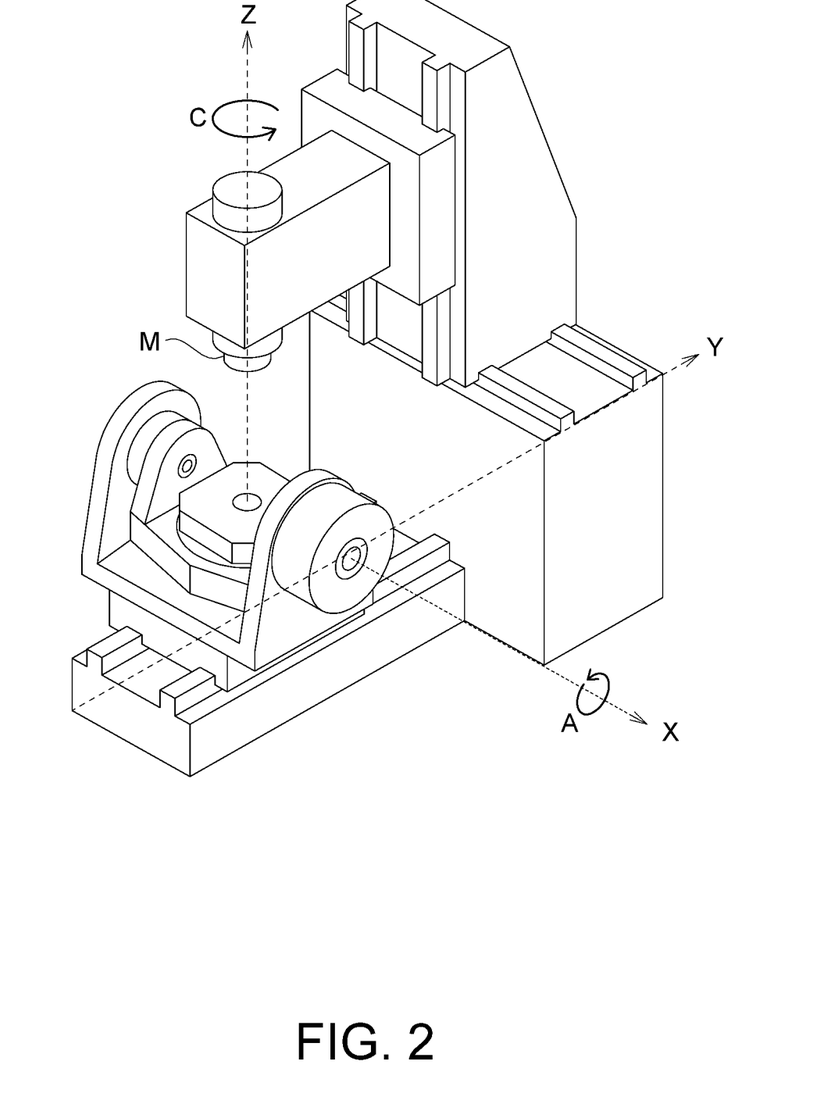
FIG. 2 is a schematic diagram of a machine tool to which the calibration method according to the embodiment of the present invention can be applied.
Figure 3:
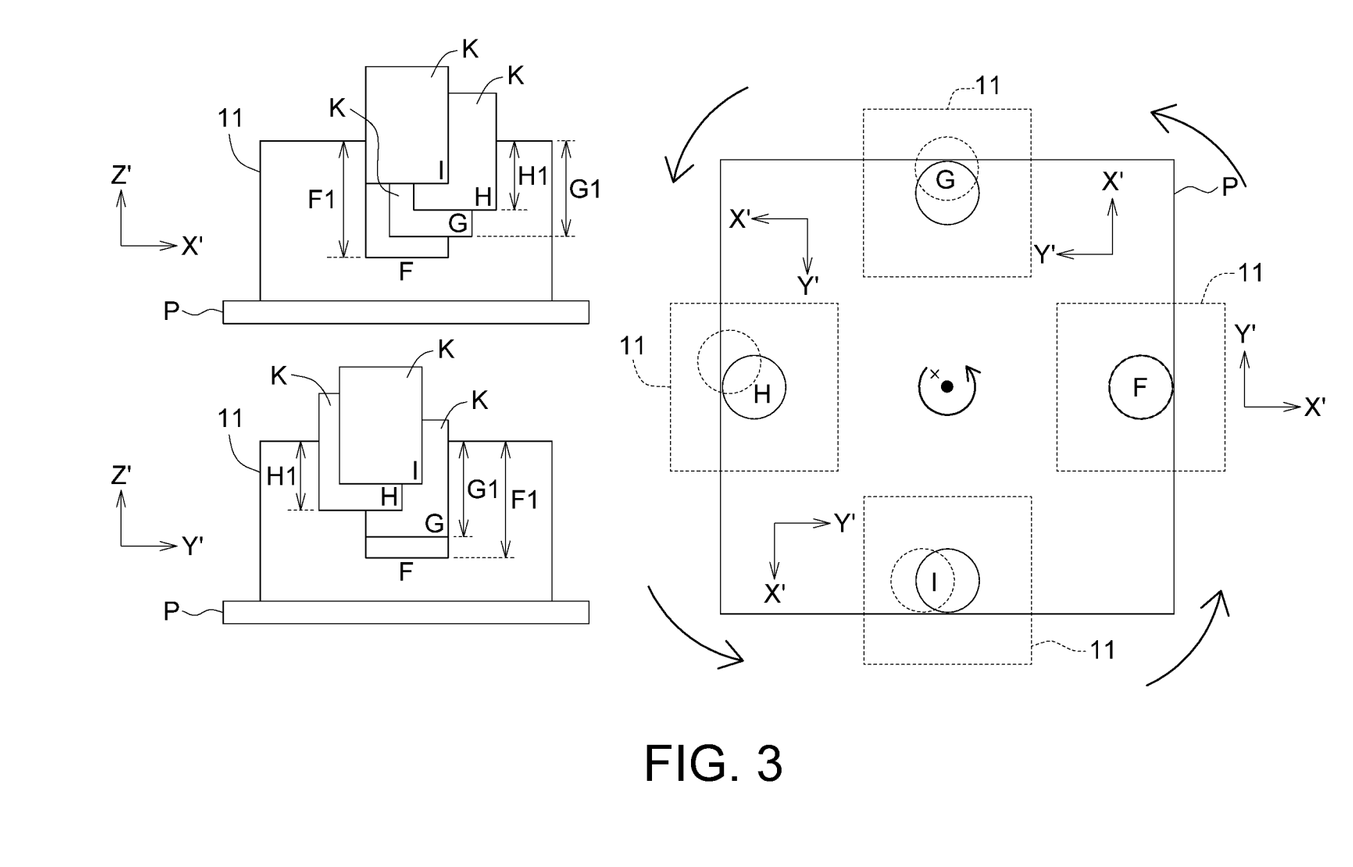
FIG. 3 is a schematic diagram of a first machining mode in the calibration method according to the embodiment of the present invention.

Please refer to FIGS. 1-3. FIG. 1 shows a flow chart of a calibration method for machine tools according to an embodiment of the present invention. FIG. 2 shows a schematic diagram of a machine tool to which the calibration method according to the embodiment of the present invention can be applied. FIG. 3 is a schematic diagram of a first machining mode in the calibration method according to the embodiment of the present invention.

The calibration method of the present invention can be implemented through a calibration system including a workpiece 11, a measuring element 12 and a processing control element (not shown in the figure, for example, it may be a programmable controller). For example, the machine tool to which the calibration method according to the embodiment of the present invention can be applied may be a common multi-axis machining machine in the mechanical field, such as a five-axis machine tool shown in FIG. 2 that has three linear axes (that is, a X-axis, a Y-axis and a Z-axis commonly known in the mechanical field) and two rotation axes (that is, any two axes of a A-axis, a B-axis, and a C-axis commonly known in the mechanical field), where the A-axis, B-axis and C-axis are the rotation axes for corresponding to the X-axis, Y axis and Z-axis, respectively.

In the step S110, provide the workpiece 11 on the machine tool. For example, fix the workpiece 11 on a stage P of the machine tool. First, measure the rotation axis parallel to a main shaft of the machine tool (take the C-axis as an example to describe the embodiment). The main shaft of the machine tool described here refers to the shaft on which a cutter of the machine tool is installed and which drives the cutter.

In the step S120, rotate the workpiece 11 around a first rotation axis (C-axis) of the machine tool and processing the workpiece 11 by a first machining mode, wherein the first rotation axis (C-axis) is parallel to the main shaft of the machine tool. As shown in FIG. 3, the upper left half of FIG. 3 is a schematic front view of the relative position of the workpiece 11 and a cutter K for processing, that is, the viewing angle is along the Y-direction. The lower left half of FIG. 3 shows a schematic side view of the relative position of the workpiece 11 and the cutter K for processing, that is, the viewing angle is along the X-direction. The right half of FIG. 3 shows a schematic top view of the stage P in a plurality of rotation states, that is, the viewing angle is along the Z-direction.

To be more specific, the workpiece 11 is first cut at a machining position F to form a groove with a depth F1. Then, the stage P of the machine tool rotates 90 degrees (counterclockwise), driving the workpiece 11 to rotate from the machining position F to a machining position G, while the horizontal position of the cutter K of the machine tool is raised at the same time. Also, the cutter K also follows the workpiece 11 with a path of five-axis simultaneous machining to the machining position G and cuts the workpiece 11 at the raised horizontal position. If the rotation center of the first rotation axis (C axis) of the machine tool has an offset error, the cutter K will cut the workpiece 11 to form a platform structure (corresponding to the dotted circle at the machining position G) having a depth G1.

Under the same operation mode, the stage P of the machine tool rotates 90 degrees (counterclockwise), driving the workpiece 11 to rotate from the machining position G to a machining position H, while the horizontal position of the cutter K of the machine tool is raised at the same time. Also, the cutter K also follows the workpiece 11 with a path of five-axis simultaneous machining to the machining position H and cuts the workpiece 11 at the raised horizontal position. If there is an offset error in the rotation center of the first rotation axis (C axis) of the machine tool, the cutter K will cut the workpiece 11 to form a platform structure (corresponding to the dotted circle at the machining position H) having a depth H1.

Under the same operation mode, the stage P of the machine tool rotates 90 degrees (counterclockwise), driving the workpiece 11 to rotate from the machining position H to a machining position I, while the horizontal position of the cutter K of the machine tool is raised at the same time. Also, the cutter K also follows the workpiece 11 with a path of five-axis simultaneous machining to the machining position I and cuts the workpiece 11 at the raised horizontal position. If there is an offset error in the rotation center of the first rotation axis (C axis) of the machine tool but the offset error of the machining position I is not greater than the offset errors of the machining position G and the machining position H, there is not an apparent platform structure (but the actual position corresponds to the dotted circle of the machining position I) having a depth formed on the workpiece 11 at the machining position I after the first machining mode is performed. In short, the dotted circle is the offset error under dynamic conditions, so that after the actual cutting, the segment or dimensional error is caused. If there is no dynamic offset error, the holes after the four-time cutting will be located at the same machining position F, and there will be no segment or dimensional error on the finished product of workpiece.

Finally, the stage P of the machine tool rotates 90 degrees (counterclockwise), driving the workpiece 11 to rotate from the machining position I to return to the initial machining position F to complete the first machining mode. In short, the first machining mode is: cutting the workpiece 11 by the cutter K of the machine tool, wherein each time the stage P of the machine tool rotates the workpiece 11 by an angle (90 degrees), raises the horizontal position of the cutter K and making the cutter K follows the workpiece 11 with a path of five-axis simultaneous machining, and perform the cutting at the raised horizontal position. It should be noted that the coordinates of X'-Y', X'-Z' and Y'-Z' shown in FIG. 3 are the workpiece coordinates of the workpiece 11, and the workpiece coordinate of X'-Y' is rotated according to the rotation of the workpiece 11 to correspond to the machine coordinate of the stage P of machine tool after the completion of the first machining mode, so as to facilitate the subsequent measurement and calculation about the linear axis.

Figure 4:
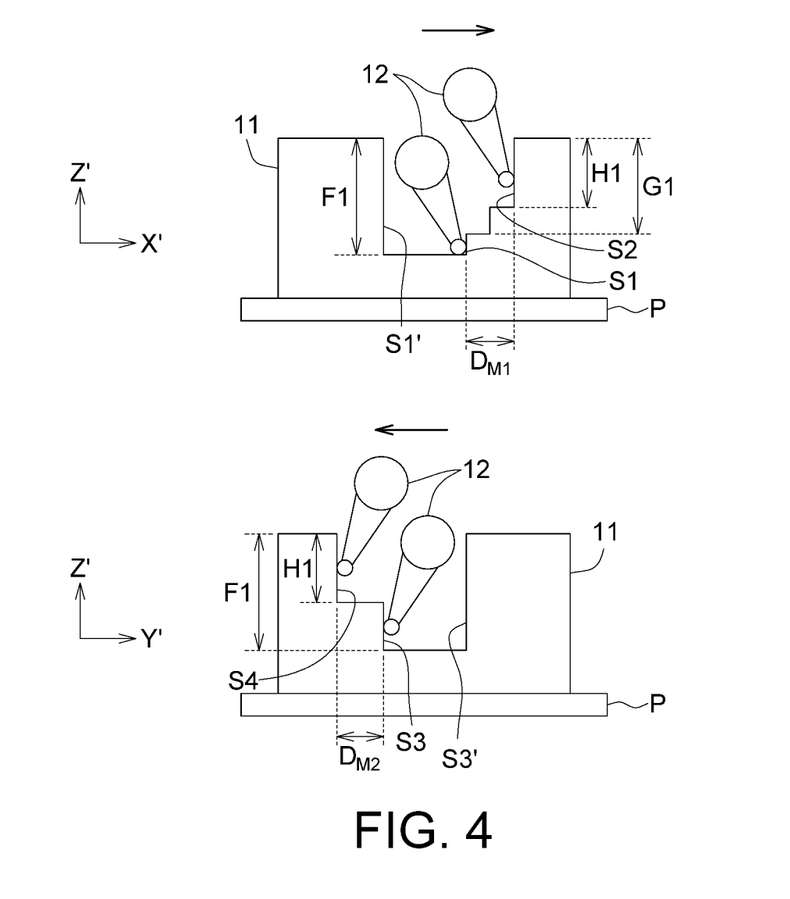
FIG. 4 is a schematic diagram of measuring a first dimensional error of a shape of the workpiece along directions of a first linear axis and a second linear axis in the calibration method according to the embodiment of the present invention.

Next, In the step S130, measure a first dimensional error of a shape of the workpiece 11 along directions of a first linear axis (X-axis) and a second linear axis (Y-axis) of the machine tool, wherein the first dimensional error of the shape includes a first segment difference $D_{M1}$ and a second segment difference $D_{M2}$. The first linear axis (X-axis) and second linear axis (Y-axis) are perpendicular to the first rotation axis (C-axis). Please refer to FIG. 4. FIG. 4 shows a schematic diagram of a measuring element 12 that measures the first dimensional error of a shape of the workpiece 11 along directions of the first linear axis (X-axis) and the second linear axis (Y-axis).

First, the measuring element 12 can be fixed on an end of the main shaft of the machine tool. For example, the measuring element 12 is a dial indicator. As shown in the upper half of FIG. 4, the measuring element 12 contacts with the workpiece 11 processed by the first machining mode along the direction of the first linear axis (X-axis), wherein the workpiece 11 is processed to form a segment difference structure between a surface S1 (a side wall being cut out at the machining position F) and a surface S2 (a side wall being cut out at the machining position H). The measuring element 12 is configured to measure the first segment difference $D_{M1}$ between the surface S1 and the surface S2 farthest in the segment structure along the direction of the first linear axis (X-axis). Since the movement of the measuring element 12 measuring from the surface S1 to the surface S2 is toward the positive X-direction, so the first segment difference $D_{M1}$ is taken as a positive value. In FIG. 4, since the surface S1' formed after the workpiece 11 is processed and opposite to the surface S1 is a flat sidewall, there is no segment difference structure formed on the side of the surface S1'. However, if the surface S1' is not a flat sidewall but has a segment difference structure, the measuring element 12 needs to measure a segment difference between the surface S1' and a surface farthest from the surface S1' along the direction of the first linear axis (X-axis). In this condition, the measuring element 12 will perform measuring from the surface S1 toward the negative X-direction, so the measured segment difference needs to be taken as a negative value. In other words, the first segment difference $D_{M1}$ is the segment difference between the original machining position F and the machining positions G, H, and I in the direction of the first linear axis (X-axis). The actual method is to measure the maximum offset value of a single side wall in the X-axis direction.

After measuring the first segment difference $D_{M1}$ along the direction of the first linear axis (X-axis), the measuring element 12 continues to contact with the workpiece 11 processed by the first processing mode along the direction of the second linear axis (Y-axis). As shown in the lower half of FIG. 4, the workpiece 11 is processed to form a segment difference structure between a surface S3 (the sidewall being cut out at the machining position F) and a surface S4 (the sidewall being cut out at the machining position H), the measuring element 12 is configured to measure the second segment difference $D_{M2}$ between the surface S3 and the surface S4 which are farthest apart in the segment difference structure along the direction of the second linear axis (Y-axis). Since the movement of the measuring element 12 measuring from the surface S3 to the surface S4 is toward the negative Y-direction, so the second segment difference $D_{M2}$ is taken as a negative value. In FIG. 4, since the surface S3' formed after the workpiece 11 is processed and opposite to the surface S3 is a flat sidewall, there is no segment difference structure formed on the side of the surface S3'. However, if the surface S3' is not a flat sidewall but has a segment difference structure, the measuring element 12 needs to measure a segment difference between the surface S3' and a surface farthest from the surface S3' along the direction of the second linear axis (Y-axis). In this condition, the measuring element 12 will perform measuring from the surface S3' toward the positive Y-direction, so the measured segment difference needs to be taken as a positive value. Therefore, the first dimensional error including at least the first segment difference $D_{M1}$ and the second segment difference $D_{M2}$ can be obtained. In other words, the second segment difference $D_{M2}$ is the segment difference between the original machining position F and the machining positions G, H and I in the direction of the second linear axis (Y-axis). The actual method is to measure the maximum offset value of a single side wall in the Y-axis direction.

In the step S140, calculate a positional error of the first rotation axis (C-axis) according to the first dimensional error of the workpiece 11 to calibrate a rotation center of the machine tool. That is, calculate the positional error of the first rotation axis (C-axis) according to the first segment difference $D_{M1}$ and the second segment difference $D_{M2}$. Specifically, the obtained first segment difference $D_{M1}$ and second segment difference $D_{M2}$ can be substituted into the following algebraic formula to obtain the positional error XOC and positional error YOC of the first rotation axis (C-axis), such as: $XOC=-(dx_{max}+dx_{min})/2$, $YOC=-(dy_{max}+dy_{min})/2$, the meaning of the algebraic formula is to obtain the average value of the segment differences caused by an offset of two side walls formed from the processed workpiece in the direction of a single linear axis (X-axis or Y-axis) and then multiply the obtained average values in the direction of the first linear axis by a negative sign (because the positional error XOC and the positional error YOC are opposite to the direction of measurement). The segment differences caused by the offset of two side walls formed from the processed workpiece 11 in the direction of the X-axis at least include the first segment difference $D_{M1}$. The segment differences caused by the offset of other two side walls formed from the processed workpiece 11 in the direction of the Y-axis at least include the second segment difference $D_{M2}$. Further, $dx_{max}$ is substituted into the first segment difference $D_{M1}$ which is a positive value with the largest segment difference in the X-direction, $dx_{min}$ is substituted into zero because the surface S1' is flat and no segment difference structure is formed; $dy_{max}$ is substituted into zero because the surface S3' is flat and no segment difference structure is formed, $dy_{min}$ is substituted into the second segment difference $D_{M2}$ which is a negative value with the smallest segment difference in the Y-direction. The obtained positional errors XOC and YOC are the linear offsets between the actual installation center of the C-axis of the machine tool and the ideal position in the X and Y directions. Therefore, the offset between the positional error XOC and the positional error YOC is reversely compensated by the processing control element. For example, the origin position of the first rotation axis (C-axis) adds/subtracts the positional error XOC and the positional error YOC, thereby calibrating the rotation center of the first rotation axis (C-axis) of the machine tool to an ideal position. Afterwards, the calibration of another different second rotation axis (A-axis) of the machine tool can be performed.

Figure 5:
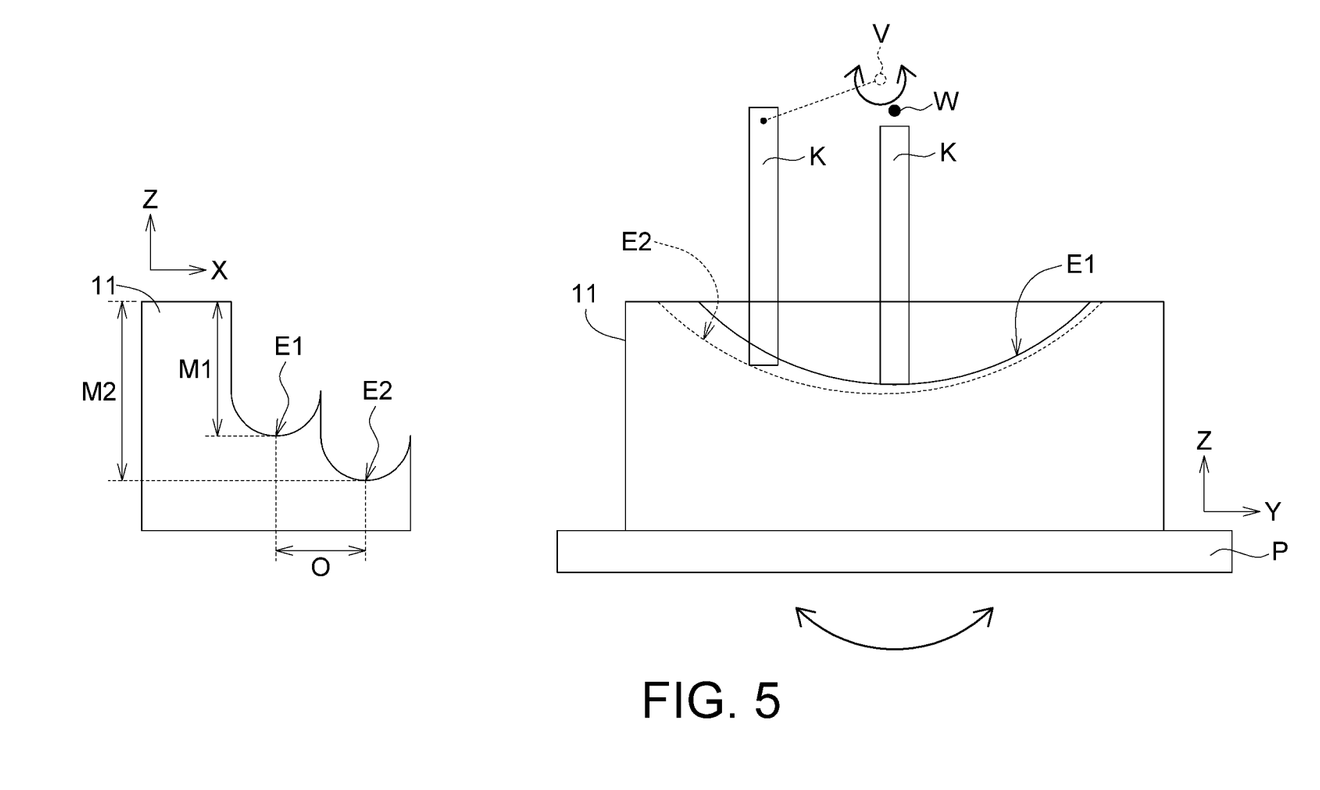
FIG. 5 is a schematic diagram of a second machining mode in the calibration method according to the embodiment of the present invention.

Then, measure the rotation axis perpendicular to a main shaft of the machine tool (take the A-axis as an example to describe the embodiment). In the step S150, rotate the workpiece 11 around the second rotation axis (A-axis) of the machine tool and process the workpiece 11 by a second machining mode, wherein the second machining mode is significantly different from the first machining mode, described as follows. Please refer to FIG. 5. FIG. 5 shows a schematic diagram of the second machining mode, wherein the left half of FIG. 5 shows a schematic front view of the workpiece 11 that goes through the second processing mode, and the viewing angle is along the Y-direction. The right half of FIG. 5 shows a schematic side view of the workpiece 11 goes through the second processing mode and the viewing angle is along the X-direction.

As shown in FIG. 5, the coordinate of the cutter K of the machine tool can be fixed first, then rotate the workpiece 11 around the second rotation axis (A-axis). The workpiece 11 can be milled to form a first processed curved surface E1 with the cutter K of the machine tool being in a fixed state. Specifically, the stage P of the machine tool rotates around the second rotation axis (A-axis), driving the workpiece 11 to swing in a cradle-like manner to move relative to the fixed cutter K, thereby forming the concave first processed curved surface E1 of the workpiece 11.

After the concave first processed curved surface E1 is formed on the workpiece 11 by milling, make a displacement O between the cutter K of the machine tool and the workpiece 11 along the direction of the second rotation axis (A-axis), and then mill the workpiece 11 with the cutter K of the machine tool moving around a circle, wherein a milling depth M2 corresponding to the milling with the cutter K moving around a circle is set to be greater than a milling depth M1 corresponding to the milling with the cutter being in a fixed state. As such, by moving the cutter K of the machine tool around the virtual rotation center V of the cutter K, a concave second processed curved surface E2 is formed on the workpiece 11 that is in a fixed state, wherein there is a misalignment between the first processed curved surface E1 and the second processed curved surface E2 due to the displacement O. If the rotation center of the second rotation axis (A-axis) of the cutter K of the machine tool has an offset error, the virtual rotation center V and a real rotation center W are not concentric, and the second processed curved surface E2 will not be parallel to the first processed curved surface E1. Thus, it is necessary to measure the offset of the rotation center of the second rotation axis (A-axis) to calibrate. In short, the second machining mode is to rotate the workpiece 11 around the second rotation axis (A-axis) and then mill the workpiece 11 to form the first processed curved surface E1 with the cutter K of the machine tool being in a fixed state; to make the displacement O between the cutter K and the workpiece 11 along the direction of the second rotation axis (A-axis) and then mill the workpiece 11 to form the second processed curved surface E2 with the cutter K of the machine tool moving around a circle, wherein the milling depth M2 corresponding to the milling with the cutter K moving around a circle is set to be greater than the milling depth M1 corresponding to the milling with the cutter K being in a fixed state. FIG. 5 is a side view of the first processed curved surface E1 and the second processed curved surface E2 that are projected and superimposed, for the convenience of description.

Figure 6A:
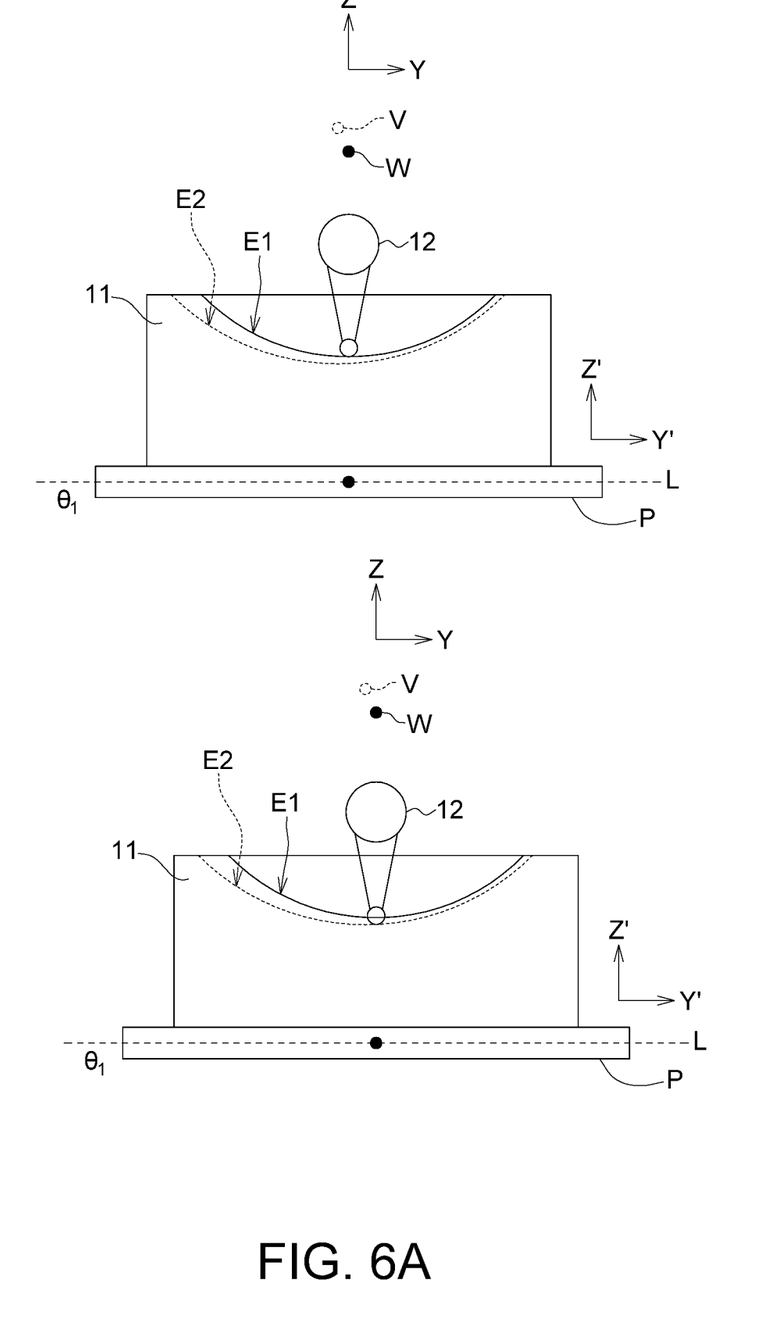
FIGS. 6A-6C are schematic diagrams of measuring a second dimensional error of a shape of the workpiece along a direction of a third linear axis in the calibration method according to the embodiment of the present invention.
Figure 6B:
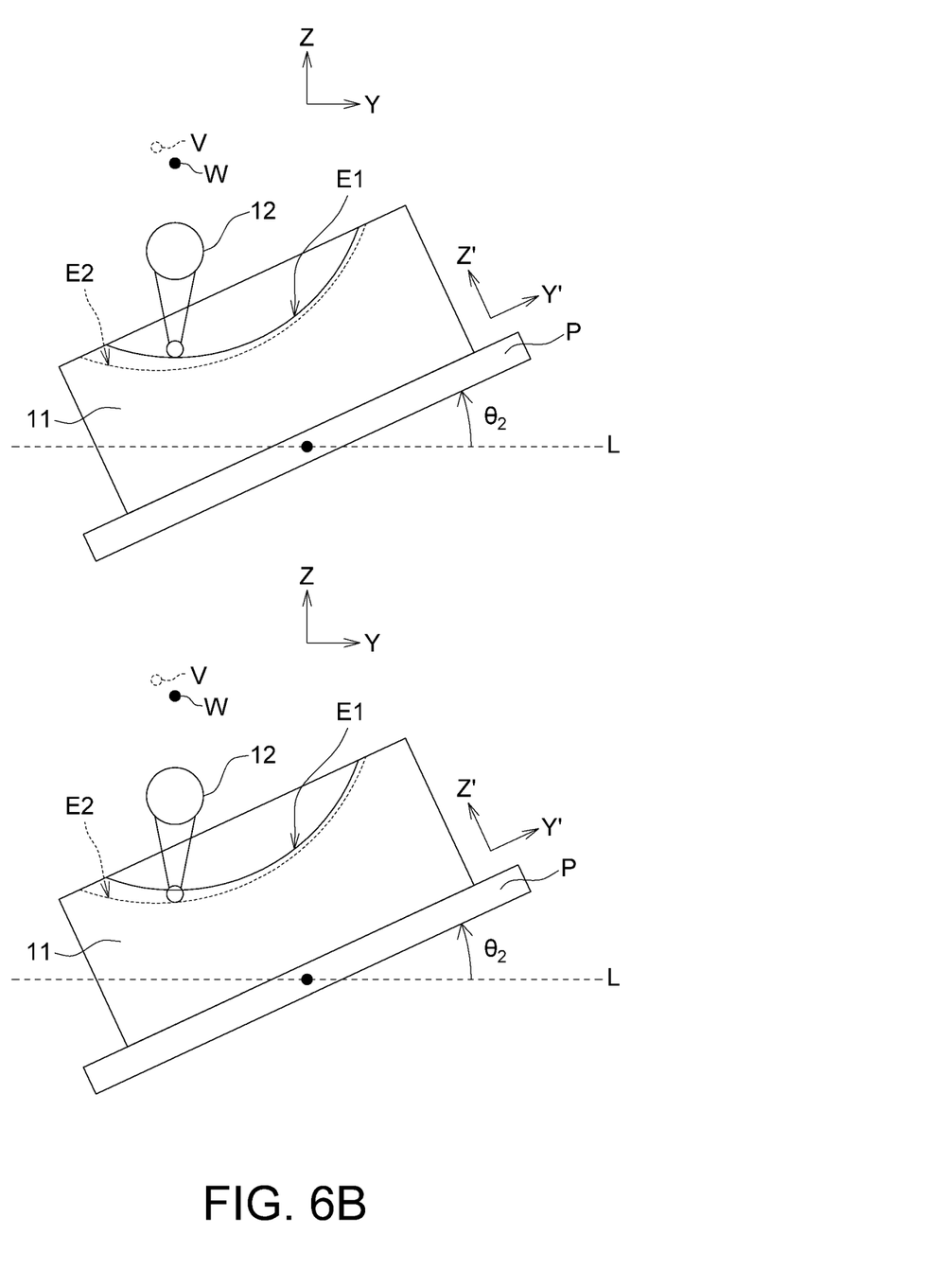
Figure 6C:
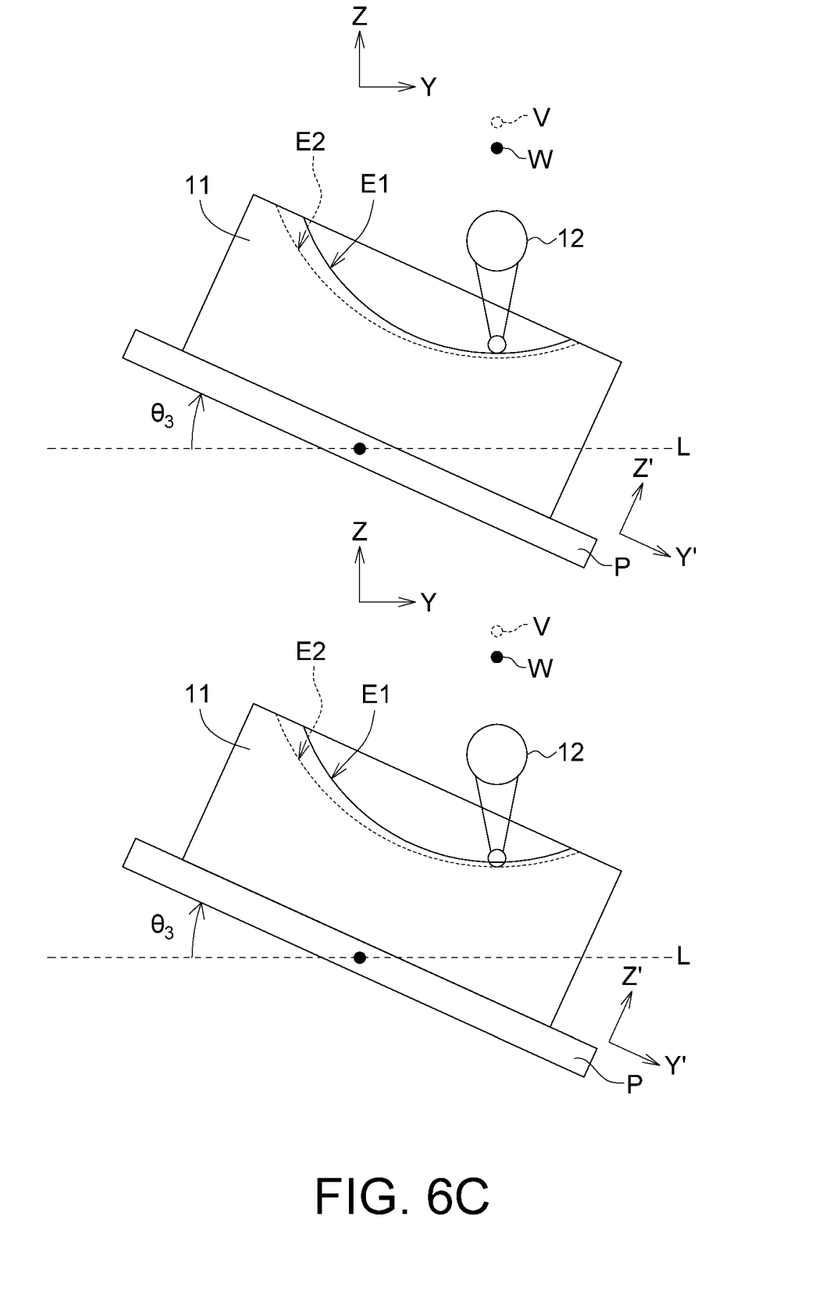

In the step S160, measures a second dimensional error of a shape of the workpiece 11 along the direction of a third linear axis (Z-axis) of the machine tool, wherein the third linear axis (Z-axis) is perpendicular to the second rotation axis (A-axis), the second dimensional error of the shape includes a first depth difference, a second depth difference and a third depth difference. Please refer to FIGS. 6A-6C. FIGS. 6A-6C show schematic diagrams of the measuring element 12 measuring the second dimensional error of the shape of the workpiece 11 along the direction of the third linear axis (Z-axis). Wherein, FIG. 6A shows that the measuring element 12 measures the first processed curved surface E1 and the second processed curved surface E2 of the workpiece 11 at a first rotation angle $\theta_1$ along the direction of the third linear axis (Z-axis); FIG. 6B shows that the measuring element 12 measures the first processed curved surface E1 and the second processed curved surface E2 of the workpiece 11 at a second rotation angle $\theta_2$ along the direction of the third linear axis (Z-axis). FIG. 6C shows that the measuring element 12 measures the first processed curved surface E1 and the second processed curved surface E2 of the workpiece 11 along the direction of the third linear axis (Z-axis) at a third rotation angle $\theta_3$.

To be more specific, the measuring element 12 can be fixed to an end of the main shaft of the machine tool. As shown in FIG. 6A, the workpiece 11 is rotated around the second rotation axis (A-axis) by the first rotation angle $\theta_1$, where the so-called rotation angle is the angle relative to a horizontal line L with the stage P rotating along the second rotation axis (A-axis). Taking FIG. 6A as an example, the first rotation angle $\theta_1$ is, but not limited to, 0 degree. As shown in the upper half of FIG. 6A, the measuring element 12 contacts with the workpiece 11 at the first rotation angle $\theta_1$ along the direction of the third linear axis (Z-axis) and measures a read value of the depth of the first processed curved surface E1. As shown in the lower half of FIG. 6A, the measuring element 12 contacts with the workpiece 11 at the first rotation angle $\theta_1$ along the direction of the third linear axis (Z-axis) and measures a read value of the depth of the second processed curved surface E2. As shown in FIG. 6B, the workpiece 11 is rotated around the second rotation axis (A-axis) by a second rotation angle $\theta_2$, in this condition, the second rotation angle $\theta_2$ is an acute angle relative to the horizontal line L with the stage P rotating around the second rotation axis (A-axis) counterclockwise. As shown in the upper half of FIG. 6B, the measuring element 12 contacts with the workpiece 11 at the second rotation angle $\theta_2$ along the direction of the third linear axis (Z-axis) and measures the depth of the first processed curved surface E1. Then, as shown in the lower half of FIG. 6B, the measuring element 12 contacts with the workpiece 11 at the second rotation angle $\theta_2$ along the direction of the third linear axis (Z-axis) and measures a read value of the depth of the second processed curved surface E2. As shown in FIG. 6C, the workpiece 11 is rotated by a third rotation angle $\theta_3$ with the second rotation axis (A-axis), in this condition, the third rotation angle $\theta_3$ is an acute angle relative to the horizontal line L with the stage P rotating around the second rotation axis (A-axis) clockwise. As shown in the upper half of FIG. 6C, the measuring element 12 contacts with the workpiece 11 at the third rotation angle $\theta_3$ along the direction of the third linear axis (Z-axis) and measures a read value of the depth of the first processed curved surface E1. As shown in the lower half of FIG. 6C, the measuring element 12 contacts with the workpiece 11 at the second rotation angle $\theta_2$ along the direction of the third linear axis (Z-axis) and measures a read value of the depth of the second processed curved surface E2.

Therefore, record the above-mentioned read values to calculate the depth difference between the two curved surfaces (namely, the first processed curved surface E1 and the second processed curved surface E2) formed from the workpiece 11 by the milling at the same rotation angle. Specifically, the first depth difference between the depth of the first processed curved surface E1 and the depth of the second processed curved surface E2 at the first rotation angle $\theta_1$ can be calculated by the processing control element. Also, the second depth difference between the depth of the first processed curved surface E1 and the depth of the second processed curved surface E2 at the second rotation angle $\theta_2$ can be calculated by the processing control element. Besides, the third depth difference between the depth of the first processed curved surface E1 and the second processed curved surface E2 at the third rotation angle $\theta_3$ can be calculated by the processing control element. Therefore, a second dimensional error including at least the first depth difference, the second depth difference and the third depth difference can be obtained.

In the step S170, the positional error of the second rotation axis (A-axis) is calculated according to the second dimensional error to calibrate the rotation center of the machine tool. Specifically, firstly obtain coordinates of a first contact point, a second contact point and a third contact point between the measuring element 12 and the first processed curved surface E1 of the workpiece 11 being at the first rotation angle $\theta_1$, the second rotation angle $\theta_2$ and the third rotation angle $\theta_3$ respectively. The coordinates of the first contact point, the second contact point and the third contact point between the first processed curved surface E1 by the first milling and the measuring unit 12 can be directly obtained by the processing control unit of the machine tool. Then, the processing control element is configured to calculate a coordinate of center of circle corresponding to the first processed curved surface E1 according to the first contact point, the second contact point and the third contact point. The circle formula can be obtained by substituting the coordinates of the first, second and third contact points into the general formula of a circle: $y^2+z^2+a_1y+b_1z+c_1=0$, and then constants $a_1$, $b_1$ and $c_1$ can be known. Then, the general formula of the circle can be converted into $(y-d_1)^2+(z-e_1)^2=r_1^2$ to obtain the Z-Y coordinates $(d_1, e_1)$ of the center of the circle corresponding to the first processed curved surface E1. The processing control element is further configured to calculate a coordinate of a fourth contact point between the measuring element 12 and the second processed curved surface E2 of the workpiece 11 being at the first rotation angle $\theta_1$ according to the coordinate of the first contact point and the first depth difference. The processing control element is further configured to calculate a coordinate of a fifth contact point between the measuring element 12 and the second processed curved surface E2 of the workpiece being at the second rotation angle $\theta_2$ according to the coordinate of the second contact point and the second depth difference. The processing control element is further configured to calculate a coordinate of a sixth contact point between the measuring element 12 and the second processed curved surface E2 of the workpiece 11 being at the third rotation angle $\theta_3$ according to the coordinate of the third contact point and the third depth difference. The coordinates of the fourth, fifth and sixth contact points can be obtained respectively based on the first, second and third contact points plus the trigonometric functions (sine, cosine) of the first, second and third depth differences with the first rotation angle $\theta_1$, the second rotation angle $\theta_2$ and the third rotation angle $\theta_3$ and then by converting the Z'-Y' coordinate system shown in FIG. 6A-6C into the components of the Z-Y coordinate system shown in FIG. 6A-6C. By substituting the coordinates of the fourth, fifth and sixth contact points into the general formula of the circle: $y^2+z^2+a_2y+b_2z+c_2=0$, the constants of $a_2$, $b_2$, $c_2$ can be known. After knowing the general formula of the circle, convert it to $(y-d_2)^2+(z-e_2)^2=r_2^2$ to obtain the Z-Y coordinates $(d_2, e_2)$ of the center of the circle corresponding to the second processed curved surface E2. Then, just compare the Z-Y coordinate of the center of the circle corresponding to the first processed curved surface E1, such as $(d_1, e_1)$, and the Z-Y coordinate of the center of the circle corresponding to the second processed curved surface E2, such as (d2, e2), so as to calculate the Z-axis difference ($d_2$ minus $d_1$) and Y-axis difference ($e_2$ minus $e_1$). The Z-axis difference and the Y-axis difference correspond to the positional error YOA and the positional error ZOA of the second rotation axis (A-axis). The obtained positional error YOA and positional error ZOA are the linear offsets between the actual installation center of the A-axis of the machine tool and the ideal position in the Y and Z directions. Therefore, the offsets between the positional error YOA and the positional error ZOA can be reversely compensated by the processing control unit. For example, the origin (namely, the virtual rotation center V or the real rotation center W) of the second rotation axis (A axis) adds/subtracts the positional error YOA and the positional error ZOA, thereby calibrating the rotation center of the second rotation axis (A axis) of the machine tool to an ideal position.

The present invention provides a calibration method and calibration system for machine tools, which can achieve that there is no need to use expensive instruments or special jigs/fixtures during the process of measuring the error of the rotation center and that only the simplest dial indicator is needed to measure the workpiece and then use the processing control element to obtain the rotation center error with uncomplicated mathematics, thereby perform calibration.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A calibration method for machine tools, comprising:
providing a workpiece on a machine tool;
rotating the workpiece around a first rotation axis of the machine tool and processing the workpiece by a first machining mode, wherein the first rotation axis is parallel to a main shaft of the machine tool;
measuring a first dimensional error of a shape of the workpiece along directions of a first linear axis and a second linear axis of the machine tool, wherein the first linear axis and second linear axis are perpendicular to the first rotation axis;
calculating a positional error of the first rotation axis according to the first dimensional error of the shape of the workpiece to calibrate a rotation center of the machine tool;
rotating the workpiece around a second rotation axis of the machine tool and processing the workpiece by a second machining mode different from the first machining mode, wherein the second rotation axis is perpendicular to the main shaft of the machine tool;
measuring a second dimensional error of a shape of the workpiece along a direction of a third linear axis of the machine tool, wherein the third linear axis is perpendicular to the second rotation axis; and
calculating a positional error of the second rotation axis according to the second dimensional error of the shape of the workpiece to calibrate another rotation center of the machine tool.

2. The calibration method for machine tools according to claim 1, wherein the first machining mode is:
cutting the workpiece by a cutter of the machine tool, wherein each time a stage of the machine tool rotates the workpiece by an angle, raising a horizontal position of the cutter and making the cutter follows the workpiece with a path of five-axis simultaneous machining, and performing the cutting at the raised horizontal position.

3. The calibration method for machine tools according to claim 2, wherein the angle is about 90 degrees.

4. The calibration method for machine tools according to claim 2, further comprising:
contacting a measuring element with the workpiece processed by the first machining mode along the direction of the first linear axis;
measuring a first segment difference between two surfaces formed from the processed workpiece that are farthest apart along the direction of the first linear axis;
contacting the measuring element with the workpiece processed by the first machining mode along the direction of the second linear axis; and measuring a second segment difference between another two surfaces formed from the processed workpiece that are farthest apart along the direction of the second linear axis.

5. The calibration method for machine tools according to claim 4, further comprising:
calculating the positional error of the first rotation axis according to the first segment difference and the second segment difference, comprising:
obtaining the average value of a plurality of segment differences caused by an offset of two side walls formed from the processed workpiece in the direction of the first linear axis, wherein the segment differences caused by the offset of two side walls at least include the first segment difference;
obtaining the average value of a plurality of segment differences caused by an offset of other two side walls formed from the processed workpiece in the direction of the second linear axis, wherein the segment differences caused by the offset of other two side walls at least include the second segment difference; and
multiplying the obtained average value in the direction of the first linear axis by a negative sign and multiplying the obtained average value in the direction of the second linear axis by a negative sign, so that the positional error of the first rotation axis is determined correspondingly.

6. The calibration method for machine tools according to claim 1, wherein the second machining mode is:
rotating the workpiece around the second rotation axis and then milling the workpiece to form a first processed curved surface with the cutter of the machine tool being in a fixed state; and
making a displacement between the cutter and the workpiece along the direction of the second rotation axis and then milling the workpiece to form a second processed curved surface with the cutter of the machine tool moving around a circle, wherein a milling depth corresponding to the milling with the cutter moving around a circle is set to be greater than a milling depth corresponding to the milling with the cutter being in a fixed state.

7. The calibration method for machine tools according to claim 6, further comprising:
rotating the workpiece around the second rotation axis by a first rotation angle;
contacting a measuring element with the workpiece being at the first rotation angle along the direction of the third linear axis and then measuring a depth of the first processed curved surface and a depth of the second processed curved surface;
calculating a first depth difference between the depth of the first processed curved surface and the depth of the second processed curved surface at the first rotation angle;
rotating the workpiece around the second rotation axis by a second rotation angle;
contacting the measuring element with the workpiece being at the second rotation angle along the direction of the third linear axis and then measuring a depth of the first processed curved surface and a depth of the second processed curved surface;
calculating a second depth difference between the depth of the first processed curved surface and the depth of the second processed curved surface at the second rotation angle;
rotating the workpiece around the second rotation axis by a third rotation angle;
contacting the measuring element with the workpiece being at the third rotation angle along the direction of the third linear axis and then measuring a depth of the first processed curved surface and a depth of the second processed curved surface; and
calculating a third depth difference between the depth of the first processed curved surface and the depth of the second processed curved surface at the third rotation angle.

8. The calibration method for machine tools according to claim 7, further comprising:
obtaining coordinates of a first contact point, a second contact point and a third contact point between the measuring element and the first processed curved surface of the workpiece being at the first rotation angle, the second rotation angle and the third rotation angle respectively;
calculating a coordinate of a center of a circle corresponding to the first processed curved surface according to the first contact point, the second contact point and the third contact point;
calculating a coordinate of a fourth contact point between the measuring element and the second processed curved surface of the workpiece being at the first rotation angle according to the coordinate of the first contact point and the first depth difference;
calculating a coordinate of a fifth contact point between the measuring element and the second processed curved surface of the workpiece being at the second rotation angle according to the coordinate of the second contact point and the second depth difference;
calculating a coordinate of a sixth contact point between the measuring element and the second processed curved surface of the workpiece being at the third rotation angle according to the coordinate of the third contact point and the third depth difference;
calculating a coordinate of a center of a circle corresponding to the second processed curved surface according to the fourth contact point, the fifth contact point and the sixth contact point; and
calculating the positional error of the second rotation axis according to the coordinate of the center of the circle corresponding to the first processed curved surface and the coordinate of the center of the circle corresponding to the second processed curved surface, comprising:
comparing the coordinate of the center of the circle corresponding to the first processed curved surface with the coordinate of the center of the circle corresponding to the second processed curved surface to calculate a difference in the direction of the third linear axis and a difference in the direction of the second linear axis, so that the difference in the direction of the third linear axis and the difference in the direction of the second linear axis are correspondingly determined to be the positional error of the second rotation axis.

9. A calibration system for calibrating a machine tool, comprising:
a workpiece provided on the machine tool;
a measuring element, after the workpiece is rotated around a first rotation axis of the machine tool and processed by a first machining mode, the measuring element is configured to measure a first dimensional error of a shape of the workpiece along directions of a first linear axis and a second linear axis of the machine tool, wherein the first rotation axis is parallel to a main shaft of the machine tool and the first linear axis and the second linear axis are perpendicular to the first rotation axis, and after the workpiece is rotated around a second rotation axis of the machine tool and processed by a second machining mode different from the first machining mode, the measuring element is configured to measure a second dimensional error of a shape of the workpiece along a direction of a third linear axis of the machine tool, wherein the second rotation axis is perpendicular to the main shaft of the machine tool and the third linear axis is perpendicular to the second rotation axis; and a processing control element, configured to calculate a positional error of the first rotation axis according to the first dimensional error of a shape of the workpiece to calibrate a rotation center of the machine tool and configured to calculate a positional error of the second rotation axis according to the second dimensional error of a shape of the workpiece to calibrate another rotation center of the machine tool.

10. The calibration system according to claim 9, wherein the first machining mode is:

cutting the workpiece by a cutter of the machine tool, wherein each time a stage of the machine tool rotates the workpiece by an angle, raising a horizontal position of the cutter and making the cutter follows the workpiece with a path of five-axis simultaneous machining, and performing the cutting at the raised horizontal position.

11. The calibration system according to claim 10, wherein the angle is about 90 degrees.

12. The calibration system according to claim 10, wherein the measuring element is further configured to:

contact with the workpiece processed by the first machining mode along the direction of the first linear axis; measure a first segment difference between two surfaces formed from the processed workpiece that are farthest apart along the direction of the first linear axis;

contact with the workpiece processed by the first machining mode along the direction of the second linear axis; and measure a second segment difference between another two surfaces formed from the processed workpiece that are farthest apart along the direction of the second linear axis.

13. The calibration system according to claim 12, wherein the processing control element calculates the positional error of the first rotation axis according to the first segment difference and the second segment difference, wherein the processing control element is further configured to:

obtain the average value of a plurality of segment differences caused by an offset of two side walls formed from the processed workpiece in the direction of the first linear axis, wherein the segment differences caused by the offset of two side walls at least include the first segment difference;

obtain the average value of a plurality of segment differences caused by an offset of other two side walls formed from the processed workpiece in the direction of the second linear axis, wherein the segment differences caused by the offset of other two side walls at least include the second segment difference; and multiply the obtained average value in the direction of the first linear axis by a negative sign and multiply the obtained average value in the direction of the second linear axis by a negative sign, so that the positional error of the first rotation axis is determined correspondingly.

14. The calibration system according to claim 9, wherein the second machining mode is:

rotating the workpiece around the second rotation axis and then milling the workpiece to form a first processed curved surface with the cutter of the machine tool being in a fixed state; and making a displacement between the cutter and the workpiece along the direction of the second rotation axis and then milling the workpiece to form a second processed curved surface with the cutter of the machine tool moving around a circle, wherein a milling depth corresponding to the milling with the cutter moving around a circle is set to be greater than a milling depth corresponding to the milling with the cutter being in a fixed state.

15. The calibration system according to claim 14, wherein after the workpiece is rotated around the second rotation axis by a first rotation angle, the measuring element is further configured to contact with the workpiece being at the first rotation angle along the direction of the third linear axis and then measure a depth of the first processed curved surface and a depth of the second processed curved surface; after the workpiece is rotated around the second rotation axis by a second rotation angle, the measuring element is further configured to contact with the workpiece being at the second rotation angle along the direction of the third linear axis and then measure a depth of the first processed curved surface and a depth of the second processed curved surface; and after the workpiece is rotated around the second rotation axis by a third rotation angle, the measuring element is further configured to contact with the workpiece being at the third rotation angle along the direction of the third linear axis and then measure a depth of the first processed curved surface and a depth of the second processed curved surface.

16. The calibration system according to claim 15, wherein the processing control element is further configured to:

calculate a first depth difference between the depth of the first processed curved surface and the depth of the second processed curved surface at the first rotation angle;

calculate a second depth difference between the depth of the first processed curved surface and the depth of the second processed curved surface at the second rotation angle; and calculate a third depth difference between the depth of the first processed curved surface and the depth of the second processed curved surface at the third rotation angle.

17. The calibration system according to claim 16, wherein the processing control element is further configured to:

obtain coordinates of a first contact point, a second contact point and a third contact point between the measuring element and the first processed curved surface of the workpiece being at the first rotation angle, the second rotation angle and the third rotation angle respectively;

calculate a coordinate of a center of a circle corresponding to the first processed curved surface according to the first contact point, the second contact point and the third contact point;

calculate a coordinate of a fourth contact point between the measuring element and the second processed curved surface of the workpiece being at the first rotation angle according to the coordinate of the first contact point and the first depth difference;

calculate a coordinate of a fifth contact point between the measuring element and the second processed curved surface of the workpiece being at the second rotation angle according to the coordinate of the second contact point and the second depth difference;

calculate a coordinate of a sixth contact point between the measuring element and the second processed curved surface of the workpiece being at the third rotation angle according to the coordinate of the third contact point and the third depth difference;

calculate a coordinate of a center of a circle corresponding to the second processed curved surface according to the fourth contact point, the fifth contact point and the sixth contact point; and calculate the positional error of the second rotation axis according to the coordinate of the center of the circle corresponding to the first processed curved surface and the coordinate of the center of the circle corresponding to the second processed curved surface, wherein the processing control element is further configured to:

compare the coordinate of the center of the circle corresponding to the first processed curved surface with the coordinate of the center of the circle corresponding to the second processed curved surface to calculate a difference in the direction of the third linear axis and a difference in the direction of the second linear axis, so that the difference in the direction of the third linear axis and the difference in the direction of the second linear axis are correspondingly determined to be the positional error of the second rotation axis.

\* \* \* \* \*